Aug. 29, 1972   J. D. TERRANA ET AL   3,687,624
PROCESS FOR RECOVERING SULFUR DIOXIDE FROM
A GAS CONTAINING SAME
Original Filed Nov. 9, 1967   3 Sheets-Sheet 1

*Fig. 1.*

INVENTORS
JACK D. TERRANA
LEO A. MILLER
BY
*McLean, Morton & Boustead*
ATTORNEYS INVENTORS
JACK D. TERRANA
LEO A. MILLER
BY McLean, Morton & Baustead
ATTORNEYS United States Patent Office 3,687,624
Patented Aug. 29, 1972

3,687,624
PROCESS FOR RECOVERING SULFUR DIOXIDE
FROM A GAS CONTAINING SAME
Jack D. Terrana, Tampa, and Leo A. Miller, Lakeland, Fla., assignors to Wellman-Lord, Inc., Lakeland, Fla.
Continuation-in-part of applications Ser. No. 594,431, Nov. 15, 1966, and Ser. No. 616,682, Feb. 16, 1967, and a continuation of application Ser. No. 681,662, Nov. 9, 1967. This application Sept. 11, 1970, Ser. No. 71,338
Int. Cl. C01b 17/60
U.S. Cl. 423—242
14 Claims

ABSTRACT OF THE DISCLOSURE

Process for the decomposition of a metal bisulfite which is a precursor of $SO_2$ to regenerate $SO_2$, especially for use in a system involving reaction between $SO_2$ in a gas with a sulfite to produce the corresponding bisulfite. Examples of sulfites include potassium, cesium, and rubidium sulfites. In the process, bisulfite crystals are separated from a solution containing the same and $SO_2$-partial pressure lowering materials and subsequently placed in either solution or slurry form and passed into a decomposition zone wherein the bisulfite is heated to drive the $SO_2$ out of the solution converting the bisulfite to the sulfite which can be recycled to absorb additional $SO_2$. The concentration of bisulfite in the solution fed to the decomposition zone is desirably maintained above 35 to 50%, and preferably higher, and the operating conditions of the decomposition zone are controlled to provide a high partial pressure of sulfur dioxide in the solution whereby high conversions of bisulfite to sulfite can be obtained.

---

This application is a continuation-in-port of application Ser. No. 594,431, filed Nov. 15, 1966, and application Ser. No. 616,682, filed Feb. 16, 1967. This application is also a continuation of application Ser. No. 681,662, filed Nov. 9, 1967. All of these applications are abandoned.

This invention relates to a process for the decomposition of a salt which is a precursor for a gas, such as potassium bisulfite which is a precursor for $SO_2$, and which is in solution with other salts which lower the partial pressure of the gas in the solution, and more particularly, to a system wherein crystals of the salt are first obtained and then a slurry of solution of the salt is decomposed under conditions whereby high conversions of the salt to release the gas are obtained.

In particular this invention involves integration of this process with a system disclosed in application Ser. No. 616,682 of Jack D. Terrana and Leo A. Miller, filed Feb. 6, 1967 and incorporated herein by reference. This application discloses a process for recovering sulfur dioxide from sulfur dioxide-containing gases which involves contacting the gas to be treated with an aqueous solution of potassium sulfite to absorb the $SO_2$ and produce an aqueous solution of potassium bisulfite, a precursor of sulfur dioxide. Other suitable sulfites are cesium and rubidium sulfites although for simplicity, the disclosure hereinbelow will refer to potassium sulfite. The $SO_2$ precursor, e.g., bisulfite is separated from the resulting solution, e.g. by crystallization out of the solution in the form of potassium pyrosulfite crystals which are advantageously heated, preferably in the presence of water, to release sulfur dioxide and provide potassium sulfite. The process is regenerative since the potassium sulfite is advantageously returned to the initial absorption step.

The release of sulfur dioxide from a precursor such as potassium pyrosulfite depends upon its partial pressure under given conditions, e.g. when in association with or without other materials including salts such as potassium sulfate and potassium sulfite which are generally present in the resulting solution produce by reaction of the sulfur dioxide-containing stack gas with the aqueous solution of potassium sulfite. The partial pressure of sulfur dioxide in its precursor in the presence of such other materials, e.g. potassium salts, in the reaction product solution at its boiling point at standard pressure conditions can be so low, for instance, that it cannot be released in a feasible manner. In sharp contrast to this, its partial pressure when the potassium pyrosulfite is in relatively pure form, for instance, a purity greater than about 98 weight percent on a dry basis, is relatively high, for instance about 300 mm. of Hg. The purity of the potassium pyrosulfite is increased in accordance with the present invention to generally greater than about 65 wt. percent, preferably greater than about 90 or 95 wt. percent, before it is decomposed. The potassium bisulfite can be advantageously separated or recovered in the form of potassium pyrosulfite by crystallization from the $SO_2$-partial pressure lowering materials in the solution and separation, e.g. filtration. In accordance with another advantage of this invention the purity of the potassium sulfite is further enhanced by washing the crystals on the filter with a solution formed by redissolving a portion of the potassium pyrosulfite crystals.

The potassium pyrosulfite crystals removed by filtration are dissolved or slurried in water before introduction into the decomposition zone to enhance their decomposition to produce sulfur dioxide. In accordance with the present invention, the decomposition zone includes at least two stripping columns in series wherein the potassium bisulfite is partially decomposed in each column and the overhead vapor from each column provides the heat requirements for the succeeding column. In this manner, the energy requirements of the system are reduced since the total amount of steam which must be used to obtain high conversion of potassium bisulfite to potassium sulfite is reduced. When the partial pressure of sulfur dioxide in the overhead vapors equals the partial pressure of sulfur dioxide in solution, for example, no more sulfur dioxide can be removed. The use of several stripping columns provides fresh steam to drive off additional sulfur dioxide in each succeeding column, thereby improving overall conversion. Temperatures of about 200° F., or 230° F., up to about 375° F. are suitable for use in the decomposition zone.

Furthermore, since the partial pressure of sulfur dioxide increases with increasing concentration of solids, i.e. potassium bisulfite, it is desirable that the solids concentration of the solution fed to the decomposition be maintained high. The desired concentration is, however, to be balanced against the advantages of using an aqueous solution of potassium bisulfite in the decomposition zone since, in addition to providing ease of handling, the use of aqueous solutions permits the use of lower decomposition temperatures. Generally, a sufficient amount of water is added to the potassium pyrosulfite crystals to form a pumpable slurry, e.g. 60 to 70% solids, and above about 35 to 55%, preferably 40 to 50% solids are present when a solution is fed to the decomposition zone.

The present invention may be better illustrated by reference to the attached drawings and the following example, which are not to be considered as limiting the invention.

FIG. 1 is a flow sheet of a system for the recovery of $SO_2$ which system incorporates the present invention in an advantageous manner.

Figure 2:
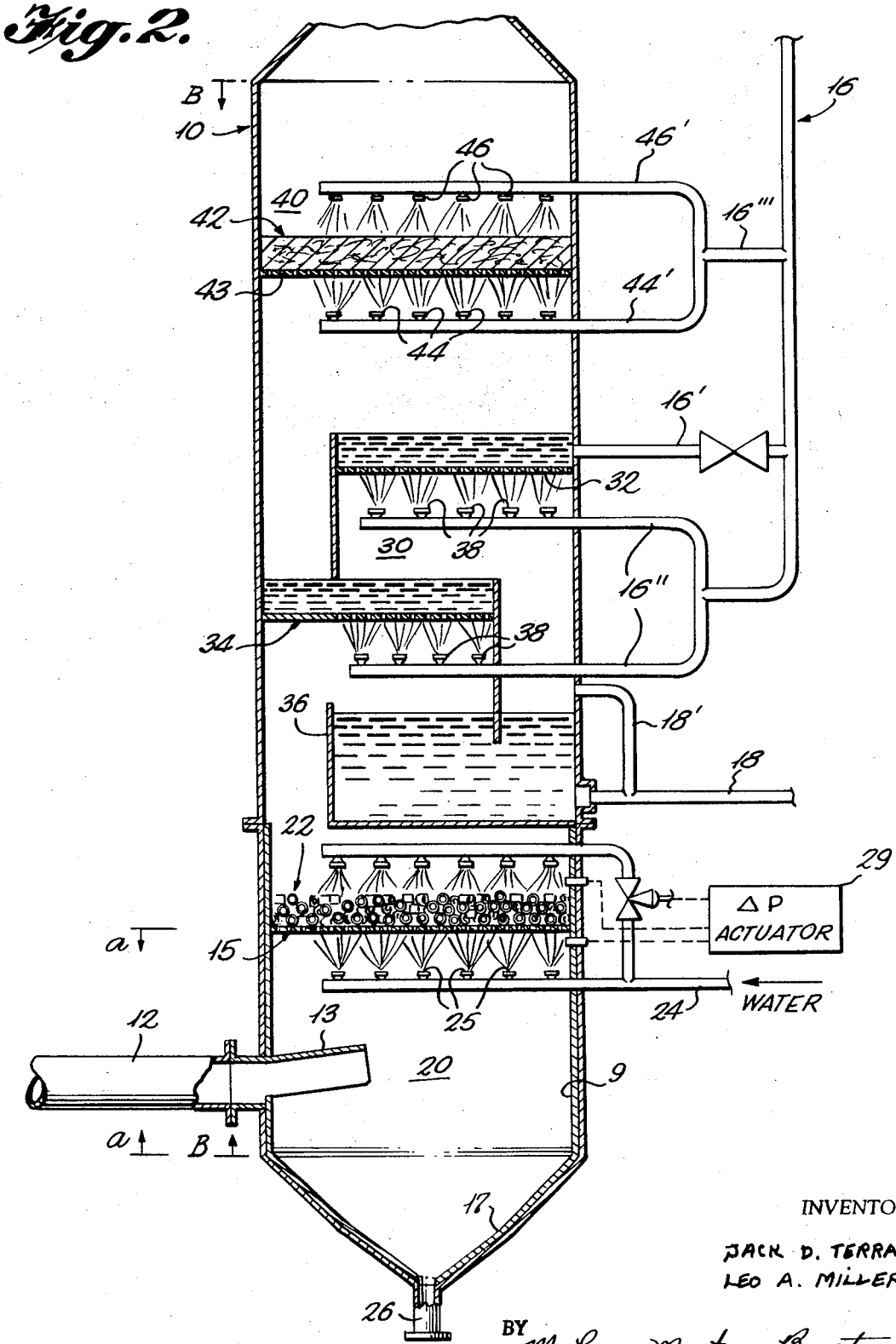
FIG. 2 is an enlarged schematic view of the absorption column 10 in the system depicted in FIG. 1.

Referring now to FIGS. 1 and 2, a gas stream containing sulfur dioxide, e.g., flue gases from a power plant or waste gas from an industrial plant, e.g. a sulpfuric acid plant or gas containing particulate solids from an aluminum plant, is introduced into reactor 10, having an inside diameter of 30 inches, constructed of 304 type stainless steel and having any suitable corrosion resistant material liner 9 which is resistant against weak sulfuric acid, e.g. lead or suitable synthetic resin liners. The gas passes through line 12, having an internal diameter of twelve inches. The reactor is of a length of 21 feet from line B—B. The amounts and rates given throughout this specification for gas and liquid specifications are based upon a reactor having these dimensions for internal diameter, i.e. 30 inches or a cross-sectional area of about 4.9 sqaure feet, and distances between components positioned in the reactor. It will be obvious to those skilled in the art that the amounts and rates of gases and liquids used will vary depending upon the size of reactor used and the distances between components employed in the reactor, however, these can be referred to as equivalents within the scope of the invention.

The concentration of sulfur dioxide in such gases is generally from about 0.001 to less than about 5 mole percent and frequently is less than about 0.5 mole percent (about 1 percent by weight). For example, a modern electric power plant of 1,350,000 kw. capacity will burn about 15,000 tons of coal per day. Much coal contains about 3.5 weight percent sulfur, or even more. The emission of sulfur dioxide from a plant of this size using such coal would then amount to about 1,000 tons per day, although the concentration of sulfur dioxide in the stack gases can be very low, for instance on the order of 0.2 to 0.3 mole percent, depending upon the sulfur content of the coal. Significant amounts, for instance greater than about 75 weight percent, of sulfur dioxide can be removed from such gases.

The waste gases may also include $SO_3$, however the concentration of $SO_3$ will vary according to the source of the gases and even flame temperatures used in processing, among other factors. It will usually not be higher than about 0.01 mol percent of the gas, normally being within the range of about 0.0001 to 0.01 mol percent, usually the majority, e.g. more than about 70 percent, of the $SO_3$ in the gas is present as $SO_3$ adsorbed on the surface of particulate solids. A particular advantageous feature provided by the prescrubber resides in its capacity to remove minimal amounts, e.g. from about 0.00001 to less than about 0.005 mol percent, of liquid soluble components in the gas stream; this being particularly useful when the gas is treated preliminarily by prescalping as described below and the residual amounts of $SO_3$ in the gas to be treated in the prescrubber are minimal.

The gas stream in line 12 is generally at a temperature of up to about 800° F., often about 150 to 600° F. For example, suitable gas streams for use in this process include flue gases from power plants burning coal or oil which typically have a temperature in the range of 250° or 300° to 360° or 400° F., off gases from sulfuric acid plants which typically have a temperature in the range of 150 to 200° F. and off gases from smelters which can have a temperature of up to about 800° F. However, at temperatures above about 400° F. it may be desirable to cool the gas to a temperature from about 225° F. to 300° F., e.g. by quenching with ambient air, to avoid deleteriously affecting the reactor, reactor lining or prescrubber operation. If the gases are below about 150° F., it may be desirable to heat the gas in line 12 to assist in removal of water from the solution in reactor 10. The flue gases will generally have a relative humidity up to about 10 percent, usually from about 1 to 7 percent. Fan 28 in FIG. 1, which draws stripped gas from the reactor, can, if desired, be arranged to blow gas through the reactor. The stripped gases removed from reactor 10 via stack 14 and the incoming gases in line 12 can be passed in a countercurrent heat relationship through a heat exchanger (not shown), if desired.

Sulfur dioxide is absorbed from the gas stream in zone 30 of reactor 10 by absorption through reaction with an aqueous solution of potassium sulfite to produce an aqueous solution of potassium bisulfite, and the stripped gases are emitted through stack 14. Although this illustration will use potassium sulfite, the corresponding sulfites of cesium, and rubidium can also be used.

The gases, e.g., flue gases in this illustration, introduced through line 12 pass under bonnet 13 which is arranged over the inlet opening of line 12 into reactor 10 and which extends into the reactor 10 a sufficient distance to prevent water or solution from passing in front of the inlet opening of line 12. It advantageously prevents plugging of inlet line 12 by components, e.g. fly ash, recovered from the gas in zone 20. Bonnet 13 extends upwardly at a slight angle to cause liquid to run back to the wall of reactor 10 and around the inlet opening of line 12 which is flush with the wall of reactor 10. The angle of bonnet 13 is generally from about 5 to 60 degrees, preferably about 10 to 45 degrees, e.g. 30 degrees, and bonnet 13 has a diameter at least equal to the diameter of the inlet opening of line 12, e.g. a 12 inch internal diameter. The most upwardly projecting portion of the bonnet in zone 20 is located at a distance sufficiently away from nozzle 25 to avoid destroying the spray pattern but close enough to avoid excessive vaporization of the mist from the spray and droplets falling off of the target and this distance is generally from about 5 to 70 inches, advantageously from about 10 to 30 inches, e.g. 15 inches, in the arrangements described herein. Any liquid running down the wall of reactor 10 or striking the upward surface of bonnet 13 thereby is directed away from the inlet opening and to the wall of reactor 10 without passing directly in front of the inlet opening.

Reactor 10, although advantageously shown as a single vessel, includes three zones which may, if desired, be separate units. These zones are a prescrubber zone 20, an absorption or reaction zone 30, and a moisture entrainment or demister zone 40.

The waste gases entering reactor 10 first pass through prescrubber zone 20 where particulate solid components, e.g. fly ash, and water-soluble components, e.g. $SO_3$, hydrocarbons including methane, ethane, propane, etc., in the gas are selectively removed from the $SO_2$ containing gas, the $SO_2$ in the gas in turn being selectively removed from the gas in zone 30. Since a majority of the $SO_3$ in the gas is usually adsorbed on the surface of the solids in the gas, it is generally removed upon removal of the solid particles. The solids, e.g. dust, in the gases are generally unreacted materials, e.g. fly ash produced by the chemical plant, or non-combustible components of the fuel.

The chemical make-up of fly ash varies, of course, with the particular fuel being burned, but usually it is composed to a large extent of silica, alumina and iron, with other metal oxides of manganese and vanadium frequently being present in minor amounts. Other suspended particulate solids which may be present in the waste gases include, for instance, particulate hollow carbon spheres which are particularly found in oil-burner off-gases, and which, like fly ash, contain significant quantities of adsorbed $SO_3$. The particle size of the suspended solids found in waste gases can be within about 0.5 to 50 microns, but may be much larger, however the predominant number of the particles range up to about 10 microns.

For instance, the fly ash in a flue gas produced from a coal plant using a Turbo feed coal grinding method had the following size distribution in the flue gas:

| Size in microns: | Weight percent of total fly ash |
|---|---|
| 0–10 | 86 |
| 10–20 | 5 |
| 20–40 | 4 |
| 40–60 | 5 | and from a coal plant using a cyclone feed coal grinding method had the following size distribution in the flue gas:

| Size in microns: | Weight percent of total fly ash |
|---|---|
| 0–10 | 45 |
| 11–20 | 23 |
| 21–45 | 20 |
| 45 | 12 |

The solids loading in gases can range from about 0.001 to 60 grains per cubic foot of gas, for instance, and for flue gases will generally range from about 1 to 10 grains per cubic foot. If the solids loading of the gas is very high, e.g. generally containing more than about 1, e.g. from about 1 to 10 grains of solid per cubic foot of power plant gas, which usually have about 1.2 to 4 grains of solid per cubic foot, and particularly if it contains large particles, e.g. having its longest dimension greater than about 1/16 inch, it may be desirable to prescalp the gas, for instance in an electrical precipitator or Cyclone separator, see FIG. 3, before introducing the gas in line 12. Generally from 80 to 90 percent of the particulate solids can be removed by prescalping with a Cyclone separator and a greater amount with an electrical precipitator, which however, is more expensive than the separator.

While the interposition of devices such as electric precipitators and centrifuges, e.g., dry cyclones, between the source of the waste gases and the chemical absorption zone will readily serve to preliminarily remove the bulk of the larger of such solid contaminants, in order to provide essentially complete removal of these solids prior to contacting the gases with the absorbing solution it has heretofore been necessary to employ a great number of such devices in series or parallel relationship. This results in high cost of operation or capital investment. A particular advantageous feature provided by the prescrubber resides in its capacity to substantially remove even minimal amounts, e.g. from 0.001 up to about 1 grain per cubic foot of gas, of particulate solids which are not removed by the use of a separator or electrical precipitator and unless removed, would deleteriously affect the system; moreover, the solids are removed efficiently and with minimum capital cost.

Scrubbing water is introduced via line 24 to the lower section of reactor 10 and is upwardly discharged in the form of a fine spray through spray nozzle 25 having an orifice generally sufficient to provide 0.1 gallon per minute (g.p.m.) per 2000 cubic feet per minute (c.f.m.) of gas and producing spray in an arc generally from about 10 to 125°, e.g. 75°, having spray droplets ranging in size generally from about 200 to 800 microns, advantageously for removing particulates of a size up to about 60 microns. The temperature of the scrubbing liquid, e.g. water, is generally from about 50 to 120° F., preferably from about 70 to 90° F. A plurality of nozzles can also be employed as shown in FIG. 2. Positioned generally from about 4 to 18 inches, e.g. about 9 inches, above the nozzle 25 is a substantially horizontally disposed, fluid, e.g. gas or liquid, -permeable impingement target assembly having little continuous extensive surface. It advantageously consists of columns or tabular members forming a lattice-like tray support 15, preferably formed from an expanded metal, e.g. stainless steel. Held by the support 15 is packing material 22 composed of about three layers of randomly arranged, non-porous, packing components, e.g. Raschig rings, Intalox or Berl saddles, preferably of ceramic composition, the individual components having a longest dimension generally from about 0.25 to 3.5 inches, e.g. 1½ inches, and forminf a packing column generally from about 1.5 to 5.5 inches in height and advantageously from about 3 to 4 inches in heightfi weighing generally from about 30 to 70 pounds per cubic foot and having generally from about 50 to 90 percent free space.

As indicated in the drawing, the spray nozzle 25 is positioned near enough to the support 15 to provide a continuous spray of water at a superficial velocity sufficient to overcome gravity, contact and wet the target surface, generally from about 2 to 20 f.p.s., e.g. about 5 f.p.s. The water reaches, contacts and wets the column support and the layer of packing material retained thereon, and falls downwardly as large droplets to carry away particulate solid and $SO_3$ components which are removed from the gas stream. The spray of water entraps the larger solid particles causing them to fall out of the gas stream while partially dissolving water-soluble $SO_3$ in the gas stream and, as the waste gas passes through the impingement material, substantially all, e.g. at least about 90 percent, of the remaining smaller solids and $SO_3$ in the gas strike and stick to wetted areas of the impingement material, forming droplets which enlarge to a point to overcome the forces of gravity and adhesion to the surface of the material and fall or are washed off of the impingement material by the spray of water. Generally, in excess of 95 weight percent, for instance in excess of 99 percent, of the particulate solids may be removed from the gas. The removal of $SO_3$ is particularly desirable since in this system it produces potassium sulfate which deleteriously affects the recovery of $SO_2$ by, for instance by consuming potassium sulfite which would otherwise be consumed by $SO_2$.

Waste gases entering the column via line 12 proceed upwardly through the support 15 and packing 22. The gas is advantageously contacted with the liquid by conducting the gas and liquid concurrently to a fluid, e.g. gas or liquid, -permeable impingement target; the gas being conducted to the target at a superficial velocity sufficient at the time of contact with the target to permeate and pass through the target in the presence of a liquid being conducted to the target at a superficial velocity sufficient at the time of contact with the target to wet the target and insufficient to permeate the target in substantial amounts. Generally, the velocity of the gas to the target is sufficient to have a predominant amount, for instance at least 60 volume percent and preferably about 90 to 100 volume percent, permeate and pass through the target. Generally, the superficial velocity of the gas at the time of contact with the target will range from about 2 to 15 f.p.s. and preferably from about 7 to 12 f.p.s., e.g. 10 f.p.s.

The superficial velocity of the liquid at the time of contact with target is generally from about 2 to 15 f.p.s. and preferably from about 5 to 10 f.p.s., e.g. 8 f.p.s. The amount of liquid employed is sufficient to effect transfer of particulate solid or liquid-soluble components in the gas to the liquid on contact with the target and this will depend upon the amount of particulate solid or liquid-soluble components in the gas, generally the acount of liquid will range from about 0.1 to 1 g.p.m. per 2,000 c.f.m. of gas containing from about 0.5 to 30 grains per cubic foot of particulate solid components and sufficient to dissolve the liquid-soluble components in the gas. The pressure drop of the gas through packing 22 will generally range from about 0.25 to 0.5, e.g., 0.4, inches of water at 2000 c.f.m. of gas. Moreover, substantial interstitial holdups of liquid in the packing is avoided.

The liquid employed in the present invention can be any suitable liquid which is chemically inert to the impingement target and which does not deleteriously affect the mass transfer, particularly when the mass transfer of non-solid components is involved, the liquid is advantageously one that will also selectively dissolve and remove the non-solid components. For instance, water can be employed to selectively and simultaneously remove particulate solids and $SO_3$ from a gas stream. Suspended solids present in the gases impinge upon and are restrained by the wet surface presented by both the support 15 and the layer of packing material 22. These solids are washed off the packing and support by the downwardly falling, spent scrubbing water which has been checked and driven back by the target assembly. The spent scrubbing water, containing removed solids and absorbed sulfur trioxide, flows by force of gravity down the funnel shaped sides of collection bottom 17 of column 10 and out the spent scrubbing water discharge line 26. An important feature is the positioning of a surface such as collection bottom 17 in a droplet receiving relationship with the impingement target to receive droplets falling off of the target and remove them from zone 20 before substantial evaporation of the droplets can occur and thus substantially preclude the return of particulate solid, e.g. fly ash, or liquid-soluble, e.g. $SO_3$, components to the target by the incoming gases. Referring to FIG. 2, the distance between points a—a in this illustration is 6 feet and surface 17 projects downwardly at a 60° angle to outlet 26. Suspended solids and sulfur trioxide are thus removed from the waste gases before the latter come in contact with the chemical absorbing solution. If desired, the spent scrubbing water, which may often have a pH of about 2 to 4, depending on the amount of sulfur trioxide in the waste gases, may be treated for separation and recovery of the solids, e.g., fly ash, and the sulfuric acid. One highly advantageous feature of this prescrubbing arrangement is that low volumes of water can be used to wet the impingement target, a particularly attractive feature since the amount of water within the present system can affect the overall efficiency of the process. Accordingly, it is desirable to only use an amount of water sufficient to contact, wet, and fall from the impingement target surface and collect the particulate solid materials and $SO_3$. Generally, less than about 0.1 g.p.m. of water, preferably from about 0.01 to 0.07 g.p.m., e.g. 0.05 g.p.m, per 2,000 c.f.m. of gases, are used. The advantage of using less than about 0.1 g.p.m. is illustrated in Table I below. By using this prescrubber arrangement, it is possible to control any increase in humidity of the gases passed through prescrubber 20 generally to not over about 8 to 10%, preferably 2%, and the temperature drop across the prescrubber is generally less than about 60° F., preferably less than about 50° F.

Use of the scrubbing apparatus described here and in the drawings, particularly in FIG. 2, has been found to provide, in addition to an extremely low temperature drop and minimal increase in the relative humidity of the gas across the scrubbing zone, particularly when processing gases at temperatures up to 500° F., also provides an assembly which is surprisingly free of plugging difficulties in contrast to a prescrubbing assembly employing continuous overhead water spray delivery which resulted in a significant temperature drop, e.g. about 100° F., and a significant increase in relative humidity, e.g. about 10 percent, and also became clogged within a short time, e.g. 2 hours, with solids removed from the gas stream. The positioning of the spray nozzles on the underside of the target permits extended operation times, e.g. up to about 16 hours, without such plugging problems. If desired, however, there may also be provided in the scrubbing apparatus of the present invention a second spray assembly 27 positioned above the target which may be activated periodically by actuating device 29, a pressure drop control, for instance about every 8 to 16 hours for a 1 to 3 minute period, to direct a downward spray on the target and thus irrigate the packing material and provide for continuous operation.

The absorber or reaction zone 30, as shown, is advantageously designed for intimate contact of countercurrently flowing gas and liquid streams, although it may be designed for concurrent flow if desired. As shown, the absorber section is illustrated with two substantially horizontally disposed sieve trays, e.g. which can be of a conventional type. Bubble cap trays can also be used. The gases are passed through reactor 10 at a superficial velocity sufficient to maintain liquid on the contact trays therein but not so great as to blow liquid out of the reactor. Typical average superficial velocities of the gases through absorber section 30 of reactor 10 are generally at least about 1.5 feet. per second (f.p.s.) and advantageously from about 2.0 to 8.5 f.p.s. The potassium sulfite solution is introduced into reactor 10 through line 16, generally at a rate of from about 0.1 or 0.4 to 20 g.p.m., preferably from about 2 to 8 g.p.m., for each 2000 c.f.m. of gas, and the potassium bisulfite solution is removed through line 18. Potassium sulfite, generally from about 40 to 60 weight percent, e.g. 50 percent, of the total solution to be introducer, is conduced from line 16 through 16''' and line 44' of demister 40, described below, to fall onto the surface of tray 32 and flow from tray 32 onto tray 34. Additional solution can be added, if desired, through line 16'. The potassium sulfite reacts with the sulfur dioxide in the gases passing through the sieve trays to produce an aqueous solution of potassium bisulfite which passes from tray 34 into the catch basin formed by downwardly projecting baffle 36 from which it is removed through line 18. The sulfur dioxide content of the gas is substantially reduced, for instance to less than about 0.02 mole percent in a stack gas containing more than about 0.2 mole percent. The potassium bisulfite is separated, e.g. crystallized, and can be recovered in crystalline form as potassium pyrosulfite which is subsequently decomposed to produce potassium sulfite and sulfur dioxide. Potassium bisulfite is transformed to potassium pyrosulfite during crystallization. The sulfur dioxide is drawn off and can be either cooled and compressed to provide a liquid product or sent as a gas to a sulfuric acid plant or sent to a reduction furnace for conversion to elemental sulfur. The potassium sulfite can be recycled to the reaction zone wherein additional sulfur dioxide is absorbed. The reactions utilized include:

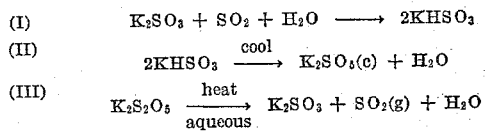

For Reaction I to proceed, the temperature of the solution in absorption or reaction zone 30 should be maintained above the temperature at which sulfur dioxide is absorbed by reaction with the aqueous solution of potassium sulfite, and below the temperature at which potassium bisulfite decomposes or Reaction III proceeds, e.g. below about 230° F. In general, the cooler the solution of potassium sulfite, the more readily sulfur dioxide will be absorbed by the solution and react with potassium sulfite. With stack or furnace gases, however, the temperature of the solution will generally be above about 90° F. or 100° F., although ambient temperatures are suitable. Preferably, the temperature is maintained below about 190° F., e.g. at about 120° to 180° or 185° F., since above these temperature ranges Reaction I begins to slow to a point where sulfur dioxide will not be readily absorbed into solution because the partial pressure of the sulfur dioxide becomes too high. Since the stripped flue gas is ultimately, after processing in demister zone 40, discharged into a stack, it is desirable to maintain the temperature of the stripped gases at a temperature sufficiently high to maintain their buoyancy so that they will rise in the stack, e.g., above about 185° F. At lower temperatures, e.g. 135° F., a fan can be used to draw off the gas. Generally the temperature of the gas from the absorber zone 30 into demister zone 40 ranges from about 120 to 180° F., e.g. 135° F. The temperature of the stripped gas in line 14 out of the demister generally ranges from about 110 to 170° F., e.g. 130° F., but it can be increased, if desired, by the introduction of a hot furnace gas through line 14'. Generally the gas out of the demister is from about 85 to 100% saturated with water.

Potassium sulfite solution is also advantageously sprayed against the underside of trays 32 and 34 by spray elements 38. Elements 38 are located generally from about 4 to 18 inches, e.g. 9 inches, from their respective trays. The velocity of the liquid is sufficient to overcome gravity. As the potassium bisulfite solution is formed on the trays, water is stripped from the solution by the hot flue gases which tends to supersaturate the solution and crystallize potassium bisulfite and plug the trays. Potassium sulfite solution from line 16 is passed to the spray elements through line 16''. The sprays are directed against the bottom of the trays where the hot flue gases first contact the trays, since at this point most evaporation of water occurs and, therefore, crystallization. A sufficient amount of solution is sprayed upwardly against the under or contact surface of the trays to keep the solids dissolved in the solution on the trays, particularly at the surface where the flue gases impinge and thus advantageously provide for continuous operation of the process. It is desired to keep the amount of solution passed to the spray elements as low as possible and generally the amount of solution is less than about 0.1, or 0.4, g.p.m. per 2000 c.f.m. The higher the temperature of the waste gases, the higher the rate of solution required to be fed to spray elements 38. For example, with gases entering reactor 10 at 300° F., about 0.1 to 0.2 g.p.m. per 2,000 c.f.m. of gas is suitable.

The potassium sulfite solution is passed through the absorber section 30 in an amount sufficient to react with the sulfur dioxide in the flue gas, i.e., absorb the sulfur dioxide in the solution, and produce potassium bisulfite. Generally these are stoichiometric amounts and advantageously a solution containing about 25 weight percent $K_2SO_3$ and 25 weight percent $KHSO_3$ can be employed.

The solution of potassium sulfite introduced into the reaction zone is preferably a recycle stream and, generally, contains from about 30 or 40 to 75, preferably about 40 or 50 to 65 weight percent solids of which generally at least about 50 percent, desirably above about 75 percent, is potassium sulfite and the balance is essentially potassium bisulfite with, possibly, some sulfate. This recycle stream is preferably a saturated solution of potassium sulfite. The potassium sulfite solution can contain a sufficient amount of an oxidation inhibitor, for instance hydroquinone, e.g., about 0.001 to 0.1 percent, to inhibit the oxidation of the sulfite ion. The temperature of this stream is controlled to avoid upsetting the requirements of reactor 10. The temperature of the recycle stream is typically from about 90° to 160° F. In general, a sufficient amount of potassium sulfite solution is contacted with the waste gas in reactor 10 to remove as much of the sulfur dioxide as possible, desirably above about 90 to 95 percent, and the residence time of the solution in the reactor, etc., is adjusted accordingly. The solution flow rate in absorber zone 30 is normally maintained sufficiently fast, and the residence time of the solution in absorber zone short enough, that crystallization problems do not occur within the absorber zone. With a slow flow rate and a high residence time, absorption of sulfur dioxide will occur; however, the solution becomes very concentrated and, therefore, the danger of crystals depositing from the solution and plugging the sieve trays is increased. The flow rate of the solution will depend upon the temperature of the gas, the amount of $SO_2$ in the gas, the temperature and concentration of the potassium sulfite solution, it will, however, generally range from about 0.1 to 200 g.p.m., preferably from about 2 to 8 g.p.m. per 2000 c.f.m. of gas. Baffle 36 forms a collector trough or catch basin for the potassium bisulfite solution. Baffle 36 can be sloped, e.g. from about 10 to 45°, or horizontal, so that any crystals contained in the potassium bisulfite solution will flow downwardly toward line 18. A relatively thick layer, e.g. a few inches (e.g. 8 inches) or several feet, of solution is maintained on baffle 36 to avoid formation of crystals in the solution and, preferably, the hold-up time in the catch basin is short, for instance generally from about 5 to 10 minutes.

The product of the reaction zone is preferably a saturated solution of potassium bisulfite, and, accordingly, the concentration of the solution is desirably maintained at just below saturation by the addition of sufficient water to avoid precipitation of potassium bisulfite. As noted above, this would occur as the crystallization of potassium pyrosulfite.

The solution resulting from a reaction of an aqueous solution of potassium sulfite and a stack gas inherently contains many ingredients, for instance the following is an example:

|  | Weight percent range | |
| --- | --- | --- |
|  | Generally | Usually |
| Potassium sulfate | 0–8 | 1–6 |
| Potassium bisulfite | 5–40 | 10–30 |
| Potassium sulfite | 10–50 | 20–45 |
| Water | Balance | Balance |

The sulfur dioxide is present in chemically combined form, for instance as potassium bisulfite, which can be considered a sulfur dioxide precursor, in the solution and is present or in contact with $SO_2$-partial pressure lowering materials for instance, metal salts, e.g. alkali metal salts, generally the potassium salts such as unreacted potassium sulfite and potassium sulfate, produced by reaction between sulfur trioxide and potassium sulfite. The purity of the potassium bisulfite in contact with the $SO_2$-partial pressure lowering materials is generally less than about 60 wt. percent on a dry basis.

The amount of solids in the solution will vary depending upon the temperature, but it is generally maintained sufficiently high for efficient sulfur dioxide recovery. There will generally be between about 40 or 45 and 75 weight percent, preferably between about 45 or 50 and 55 or 65 weight percent, solids in the solution. The amount of potassium bisulfite and potassium sulfite in the solids will vary depending upon the total percentage of solids and the temperature of the solution. In general, about 5 to 50 or 60 weight percent, preferably 10 to 35 or 50 weight percent, is potassium bisulfite and generally 40 or 50 to 95 weight percent, usually about 50 or 65 to 90 weight percent, is potassium sulfite. For example, at 77° F. a saturated aqueous solution of potassium pyrosulfite and potassium sulfite will contain about 5% potassium pyrosulfite and 47% potassium sulfite; at about 104° F. this solution will contain about 7% pyrosulfite and 48% sulfite; and at about 149° F. the solution contains about 12% pyrosulfite and 48% sulfite.

The stripped flue gases in reactor 10 pass from absorption reaction zone 30 to the moisture entrainment or demister zone 40 which includes a woven mesh contact area. The pressure drop of the gas through zone 30 will generally range from about 1.5 to 4.5, e.g. 2.5, inches of water at 2000 c.f.m. of gas. The woven mesh 42 is a material chemically inert to the components of the system, e.g. 304 stainless steel, and similar in structure and appearance to steel wool; it is shown in FIG. 2 as being retained on a column support 43. Potassium sulfite solution from line 16 passes through line 16''', and lines 44' and 46' to nozzles 44 and 46, respectively, generally positioned from about 4 to 18 inches, e.g. 9 inches, from 42, which continuously spray the solution onto the woven mesh 42 from opposite sides of the assembly, i.e., top and bottom, to advantageously avoid plugging problems and maintain a continuous operation. The demister zone 40 serves to remove droplets of solution from the gases exiting from reactor 10 to thereby limit chemical losses. The droplet can be liquid or solid forms of the reaction product generally small enough, for instance from about 1 to 100 microns in size, such that it can be supported in the velocity of the rising gas flow, normally between about 2 to 7 f.p.s. It was surprisingly found that when the contact material referred to was of a woven mesh-like structure, small amounts of solution could be advantageously employed. However, a material providing a large amount of contact surface and a highly irrigatable contact surface, e.g. Raschig rings, can be employed but require larger amounts, e.g. 15 g.p.m. of solution. The thickness of demister zone 40, e.g. about 1 to 4 inches, is sufficient to remove droplets from the exit gases but not so large as to create a large pressure drop, and the gas flow through demister zone 40 is below the point at which droplets from the contact area would be re-entrained. The maximum desirable pressure drop is generally in the range of about ¼ to ½ inch of water and, typically, gas velocities of about 2 to 6 f.p.s. are suitable. Generally, solution is added to the demister zone in an amount sufficient to avoid plugging of the demister and insufficient for entrainment in the exiting gases. This demister embodiment is highly efficient and only requires the use of small amounts of solution. For example, generally about 2 to 5 or 6, preferably about 3 to 3½, or 4 g.p.m. of solution per 2,000 c.f.m. of gas flow are suitable, being divided preferably equally between nozzles 44 and 46. The amount of solution used will decrease with decreasing concentration of the solution and it is desirable to maintain the flow as low as possible. The demister zone 40 also functions to remove the last traces of sulfur dioxide contained in the exiting gases. For example, the demister normally removes an additional 1 to 2% of the total sulfur dioxide in the incoming waste gases.

In this system sufficient amounts of the $SO_2$-partial pressure lowering materials are separated from the potassium bisulfite to increase the partial pressure of the sulfur dioxide in the potassium bisulfite. The separation of the $SO_2$-partial pressure lowering materials can be effected by any suitable procedure, by for instance by selectively extracting the potassium bisulfite from the solution or by extracting any one of the $SO_2$-partial pressure lowering materials from the solution. The separation is preferably conducted by crystallizing the potassium bisulfite (which transforms to potassium pyrosulfite during crystallization) out of the solution for further treatment in accordance with the system as set forth below.

The release of sulfur dioxide from a precursor such as potassium pyrosulfite depends upon its partial pressure under given conditions, e.g. when in association with or without other materials including salts such as potassium sulfate and potassium sulfite which are generally present in the resulting solution produced by reaction of the sulfur dioxide-containing stack gas with the aqueous solution of potassium sulfite. The partial pressure of sulfur dioxide in its precursor in the presence of other materials, e.g. potassium salts, in the reaction product solution at its boiling point at standard pressure conditions is so low, for instance for the typical solution described in an example below it is about 1.5 mm. of Hg, that it cannot be released in an economically feasible manner. In sharp contrast to this, its partial pressure when the potassium pyrosulfite is in relatively pure form, for instance a purity greater than about 98 wt. percent on a dry basis, is relatively high, for instance about 300 mm. of Hg. The purity of the potassium pyrosulfite is increased in accordance with the present invention to generally greater than about 65 wt. percent, preferably greater than about 90 or 95 wt. percent. The following table sets forth the partial pressure of the sulfur dioxide in potassium pyrosulfite for the indicated purity.

TABLE

| Purity of $K_2S_2O_5$, wt. percent (dry basis) | Partial pressure of $SO_2$ mm. of Hg |
|---|---|
| 65 | 5.0 |
| 70 | 6.1 |
| 75 | 8.5 |
| 80 | 13.3 |
| 85 | 21.0 |
| 90 | 33.5 |
| 95 | 75.0 |
| 98 | 300.0 |

The potassium bisulfite can be advantageously separated or recovered advantageously in the form of potassium pyrosulfite by crystallization from the $SO_2$-partial pressure lowering materials in the solution. Crystallization of potassium pyrosulfite can be accomplished using suitable crystallization procedures, for instance by supersaturating the solution by heating it in a vacuum or advantageously by cooling the aqueous potassium bisulfite solution to a temperature at which a substantial portion of the pyrosulfite crystallizes, e.g. below about 100° F. or 110° F., with the lower limit being dictated by economics. For example, when a saturated solution of potassium bisulfite at 149° F. is cooled to 104° F., approximately 40% of the pyrosulfite crystallizes where as when the solution is cooled to 77° F., approximately 70% of the pyrosulfite crystallizes. Since potassium sulfite is more soluble than potassium bisulfite, substantially pure, e.g. greater than about 95 wt. percent, pyrosulfite crystals can be obtained.

The potassium pyrosulfite crystals can be separated, e.g. by separation techniques such as centrifugation or filtration and heated to the decomposition temperature therefor and under ambient pressure conditions, these temperatures are generally greater than about 100° F. and sufficient to decompose the potassium pyrosulfite, for instance above about 230° F. and up to about 600° F. but preferably below temperatures at which substantial amounts of potassium sulfate form, e.g. 400° F., and preferably above about 300° F. under essentially anhydrous conditions, to release sulfur dioxide and convert the potassium pyrosulfite to potassium sulfite which is suitable for reuse. This decomposition method eliminates the need to vaporize large amounts of water to remove sulfur dioxide when anhydrous conditions are desired. The hot potassium sulfite produced upon decomposition of the crystals can be combined with the filtrate resulting from the separation of the potassium pyrosulfite and recycled to the reaction zone.

Referring to FIGS. 1 and 2 again, the potassium bisulfite solution is removed from reactor 10 through line 18 to surge tank 48 from which it is pumped (e.g. generally having only a residence time of only about 5 to 20 minutes in the surge tank) expeditiously to avoid substantial cooling and crystallization and plugging within the tank. It is pumped through line 52 by pump 54 to the flash cooler-crystallizer zone 50. Line 18 has a vacuum breaker line 18' associated with it. The solution pumped through line 52 may, if desired, be passed through a filter 56 to remove solids from the solution.

The flash cooler-crystallization zone 50 includes a flash chamber 58 wherein the solution can be advantageously cooled by vaporization of water from the solution, and a crystallization tank 60. Flash chamber 58 is maintained under vacuum, generally of about 0.5 to 4 p.s.i.a., usually from about 0.8 to 1.5 p.s.i.a., by steam ejectors 62 and 64 Such ejectors can draw a vacuum of about 0.5 p.s.i.a. As shown, steam ejectors 62 and 64 draw a vacuum on the chamber 58 through line 66 The pressure in chamber 58 is controlled by the addition of air through line 68 to control the temperature of the solution. The control of the pressure in turn controls the boiling point and pressure drop, and therefore the temperature of the solution in the flash chamber and the amount of water vaporized from the solution. Heat exchanger 70 in line 66 condenses the water evaporated from the solution in chamber 58. The condensate passes through line 72 for use in dissolving the potassium pyrosulfite crystals. The steam from ejectors 62 and 64 is also condensed and passed through lines 74 and 76 for later use in the system.

The solution in chamber 58 is normally cooled to a temperature sufficient to crystallize, i.e., remove from solution, a sufficient amount of potassium pyrosulfite to compensate for the sulfur dioxide absorbed from the gas stream in line 12 and thereby maintain a proper balance of solids in the solution for recirculation thereof. The potassium bisulfite crystallizes as potassium pyrosulfite. The amount of potassium pyrosulfite crystals removed depends upon the conversion of potassium sulfite to bisulfite in the reactor and generally, from about 3 to 15 pounds of potassium pyrosulfite crystals are removed for each pound of sulfur dioxide absorbed from the waste gases. For instance, if the conversion of sulfite to bisulfite in the aqueous solution passed through stripper 10 is about 50%, about 7 pounds of crystals will be removed in order to provide a solution particularly suitable for reuse in the absorber section, whereas at 20% conversion this amount will increase to about 15 pounds of crystals per pound of sulfur dioxide, and at a theoretical 100% conversion, the amount will be about 3 to 3½ pounds per pound of sulfur dioxide. The temperature drop in chamber 58 is determined by control of the inlet temperature of the solution, the pressure within chamber 58, residence time of the solution in chamber 58 (e.g. generally from about 15 minutes to 2 hours), recycle ratio, etc. Since temperatures of the inlet solution generally are in the range of about 80 to 200° F., usually from about 130° F. to 160° F. for power plant type gas processing and usually from about 80° F. to 110° F. for sulfuric acid plant type gas processing, and the solution will boil at about 104° F. at 1 p.s.i.a. and about 85° F. at 0.5 p.s.i.a., temperature drops generally of about 10 to 70° F. or 90° F, preferably about 30 to 50° F. or 70° F., are usually required to crystallize the desired amount of potassium pyrosulfite. The amount of water removed in the flash cooler from the system is advantageously used to maintain the water in the system in balance by correlation of the amount of water removed in the flash cooler with the amount of water removed by the gas stream in the reactor. Although water can be easily removed in the flash cooler, it requires an input of energy whereas if removed in the reactor, the energy used is only such as is normally present. Thus, a particularly attractive feature provided by prescrubber 20 resides in accomplishing the prescrubbing with liquid, e.g. water, while at the same time avoiding a significant drop in the temperature of the gas and a significant increase in the relative humidity of the gas; thus providing the gas in the absorber zone at optimum temperatures and relative humidity for absorbing water from the system inexpensively and efficiently. In the event a gas stream having a low temperature and high relative humidity is employed and has limited capacity for absorbing water, great flexibility is provided for the system in that excess water can be removed by the flash cooler.

The efficiency of the flash cooler in removing water also provides for advantageous control of filtration conditions. The filtration system employed can be a simple rotary filter and advantageous control over the temperature and residence time of the solution can be obtained with facility to control the size of crystals to enhance filter-ability with increased filtration rates and provide crystals of greater purity, e.g. 99 percent pure. It also desupersatures without nucleation and substantially avoid plugging problems which would characterize the use of a heat exchanger under the conditions of processing in the present system.

The cooled solution, or slurry, is passed from flash chamber 58 to crystallization tank 60 through line 78. The solution residence time within the crystallization tank 60 is sufficient to produce a proper size crystal for filtration, e.g., crystals larger than about 300 mesh and up to about 10 mesh. Generally a residence time of from about 5 minutes to 2 hours, or more, preferably of about 10 minutes to 45 minutes are suitable for the production of crystals of the desired size. Crystals can be obtained wherein about 80 percent of the crystals are between 10 and 60 mesh using a 45 minute retention time. Another important factor in producing crystals of this desired size is the control of the pH of the solution, e.g. generally between about 6.6 to 7.4. The pH can be controlled by adjusting the specific gravity of the reaction solution conducted out of the reactor, for instance using density control device 69 in line 71. Recycle line 80 and pump 82 are provided to control the temperature and residence time of the solution. The bottom of flash chamber 58 slopes and the line 78 extends to the bottom of tank 60 to avoid plugging by crystals formed in chamber 58 and tank 60. A demister 84, arranged in the upper section of flash chamber 58, is constructed and operates in a manner similar to demister 40 to remove entrained droplets in the gas passing through line 66.

The slurry of potassium pyrosulfite crystals formed in crystallization tank 60 is pumped by pump 86 through line 88 to a rotary drum vacuum filter, generally designated as 90. The drum filter includes a rotary drum 92 and a pan 94. The slurry is introduced into pan 94 through line 88 and drawn by a vacuum applied internally of drum 92 through the filter surface of the drum by vacuum pump 96. The filtrate solution drawn from filter drum 92 is passed through line 98 to filtrate tank 100 where it is collected and from which it is subsequently pumped through line 102 by pump 104 to absorber feed tank 106.

The potassium pyrosulfite crystals retained on the filter surface on drum 92 are removed by a scraper or doctor blade 108 and passed to a dissolver tank 110. The filtration rate of the filter is maintained as high as possible while still obtaining a clear filtrate or solution leaving the filter through line 98. Filtration rates of about 900 to 4,000, preferably 1,500 to 3,000 pounds of crystals per hour per square foot of surface area of the filter are usually obtained. The higher the filter rate the smaller the surface area of the filter required. The size of the filter cloth used can be important in maintaining a clear filtrate. For instance, if crystals filter through the cloth, the pH of the filtrate solution will drop, e.g. to a pH of about 6.3, and thus adversely affect the recycle stream by deterring the absorption of $SO_2$ as a result of an increase of the bisulfite. The vacuum applied to the drum filter by pump 96 is maintained so that the vacuum applied at drum 92 is less than the vacuum, e.g. higher pressure, applied in chamber 58. To use a lower pressure at this point in the system would additionally cool the solution to crystallize additional potassium pyrosulfite inside drum 92 which would plug the system. The filter screen utilized on drum 92 is preferably a monofilament cloth, e.g., nylon, chemically inert to the solution and slurry, which has openings generally of about 10 to 50, or 60 microns in size, preferably about 20 to 40 microns in size. The crystals can be advantageously washed by spray 112, preferably using a side stream of the 50 percent solution being conducted to the stripper column, on the filter surface to further enhance the purification of them. Since the 50 percent potassium bisulfite solution would be saturated, substantially none of the crystals are dissolved and the purity of the crystals are increased by displacement washing of the mother liquor. Also, if desired, a steam sparge or blowback 114 can be applied to the filter surface near scraper blade 108 to clean the filter surface by removing any crystals not removed by blade 108.

The potassium pyrosulfite crystals can be advantageously heated in the presence of water to enhance their decomposition to produce sulfur dioxide at relatively low temperatures. The water employed can be residual water of the mother liquor contained by the crystals or it can be added water; it can be in any suitable form, e.g. liquid or vapor form; and it is used in amounts sufficient to enhance the decomposition of the potassium pyrosulfite to produce sulfur dioxide. These amounts are at least about 0.01 weight percent, generally from about 1 to 99 weight percent and advantageously from about 20 to 75 weight percent based on the potassium pyrosulfite and water. In amounts up to about 20 weight percent water, damp crystals are provided and in amounts of about 40 weight percent, for instance, a solution can be provided. When in solution, however, the potassium pyrosulfite is in the bisulfite form.

The crystals passed into tank 110 are dissolved in sufficient water for ease of handling. Generally, enough water is added to at least form a slurry which is pumpable, e.g., contains about 60 to 70% solids, although, if desired, sufficient water can be added to form a solution. A ratio of solids to water in dissolver tank 110 is advantageously controlled by density means to a density control 103. Generally about 35 to 55%, preferably about 40 to 50%, solids are in the solution which is removed from dissolver 110 through line 116 by pump 118. Water is supplied to dissolver 110 in the form of condensate from the cooler 70 via line 72 and via lines 74 and 76 from the steam ejectors 62 and 64, respectively. Fresh water can be added through line 120, if desired.

The potassium pyrosulfite in the presence of, or in contact with, water is heated to temperatures sufficient to produce sulfur dioxide and temperatures generally from about 100 to 225° F., preferably from about 150 to 225° F. can be used under ambient pressure conditions.

The decomposition of the potassium pyrosulfite in contact with water can be conducted under ambient pressures or superatmospheric pressures, for instance from about 0 to 300 p.s.i.a., generally from about 15 to 150 p.s.i.a. although ambient pressures can be advantageously employed. In a modification of this aspect of the present invention, super atmospheric pressures can be employed when the potassium pyrosulfite is in aqueous solution to increase the concentration of the solution at higher temperatures, e.g. above about 230° F. and up to about 375° F., with a consequent increase in the partial pressure of sulfur dioxide in the potassium pyrosulfite and an enhancement of the production of sulfur dioxide. Generally the water employed in this aspect is from about 5 to 50 weight percent. For instance, if potassium bisulfite solutions are heated under a pressure of about 100 p.s.i.a. with a temperature of about 350° F., the solubility of the pyrosulfite crystal is much greater, e.g. about 75 weight percent based on the crystals and water. This higher concentration provides a much higher partial pressure of sulfur dioxide than at lower concentrations and the percent conversion of potassium pyrosulfite to potassium sulfite is greater.

The utilization of water to enhance decomposition of the of the potassium pyrosulfite is preferable to the anhydrous procedure since it obviates the desirability of using such inert materials and the expense of handling such materials and it provides for the production of sulfur dioxide at significantly lower temperatures and a higher conversion of potassium pyrosulfite (bisulfite) to sulfur dioxide.

Since there is generally a small amount of sulfur trioxide present in waste gases containing sulfur dioxide, a small amount of potassium sulfate is formed which is periodically removed. Additionally, oxygen present in the waste gases can react with the potassium sulfite to produce additional potassium sulfate so that it may be desirable to add an oxidation inhibitor, e.g. organics such as hydroquinone, etc., to the potassium sulfite solution. The potassium sulfate generally crystallizes with the pyrosulfite and can be separated by periodically redissolving the pyrosulfite crystals, which are more soluble in water than potassium sulfate. The redissolved pyrosulfite crystals can be recycled to the reaction zone after the solid potassium sulfate is removed. Potassium sulfate is desirable as a constituent of fertilizers. If desired, this process can be directed toward the production of potassium sulfate by omitting the inhibitor and increasing the amount of potassium sulfate produced.

The potassium bisulfite solution in line 116 is passed to stripper zone, designated generally as 125, where the solution is heated to a temperature, e.g. 230° to 300° F., sufficient for decomposition of the potassium bisulfite to produce sulfur dioxide and a potassium sulfite solution. The decomposition is advantageously accomplished in a multiple effect stripping operation to increase the overall conversion of potassium bisulfite to potassium sulfite and reduce the energy, i.e. steam requirements of the system. As illustrated, stripper zone 125 includes two stripping columns 122 and 122', although, if desired, three or more effects may be used. The solution fed to column 122 through line 116 is heated by steam in reboiler 138 to a temperature sufficient to decompose the potassium bisulfite in the soltuion to produce an overhead gas stream comprising sulfur dioxide and water vapor. This overhead stream is removed through line 124 and passed to reboiler 138' for the second stripper column 122' to provide the necessary energy therein for decomposition of additional potassium bisulfite. The conversion of potassium bisulfite to potassium sulfite in any particular stripper column is limited, since once the partial pressure of sulfur dioxide in the vapors within the column equals the partial pressure of sulfur dioxide in the solution, no additional sulfur dioxide can be removed from solution regardless of the energy supplied to the column. When using several columns fresh steam is produced in each column by removal of water from the solution which can be saturated with additional sulfur dioxide whereby additional decomposition of potassium bisulfite and improved conversion are obtained. Additionally, the energy or steam requirements of the system are reduced by recovering energy from the vapors produced in each stripper column through the use of these vapors to provide heat for the succeeding column. Following reboiler 138' wherein the water vapor in line 124 will be mostly a condensed product, this product is passed through line 126 to separator 128. The condensed water is removed from the bottom of separator 128 through line 130 and the sulfur dioxide as a product gas through line 131. The partially decomposed potassium bisulfite solution is withdrawn from column 122 through line 134 and passed by pump 136 to column 122' where additional potassium bisulfite is decomposed. Overhead vapors are removed from column 122' through line 124' and heat exchanger, i.e. cooler-condenser 126' to tank 128'. Condensed water vapor is removed from separator tank 128' through line 130' and sulfur dioxide as a product gas through line 131'. The stripper bottoms, which is now a potassium sulfite rich solution, is conveyed through line 134' by pump 136' to the absorber feed tank 106. A portion of the stripper bottoms in line 134 is passed through reboiler 138 to maintain proper temperature, e.g. generally from about 230 to 300° F., within the stripper column 122. The potassium sulfite solution collected in the absorber feed tank 106 is pumped by pump 140 through line 142 to feed inlet line 16 for reactor 10. The water separated in lines 130 and 130' is passed to dissolver 110 for use in dissolving potassium pyrosulfite crystals.

The first effect separator column is generally operated at an elevated pressure and temperature sufficient to decompose the potassium bisulfite, for instance up to about 200 p.s.i.a. and 600° F., but preferably below temperatures at which substantial amounts of potassium sulfate form, e.g. 400° F., and below pressures of about 150 p.s.i.a. Typically, the first effect separator 122 is operated at a temperature of about 275 to 350° F., or 400° F., and a pressure of about 40 to 80 p.s.i.a., preferably about 40 to 60 p.s.i.a. These conditions are chosen to hold the steam requirements down, that is, the amount of steam required to produce the desired amount of sulfur dioxide. In general, it is desired to hold the steam requirements within about 2 to 6, preferably about 2 to 4 pounds of steam per pound of sulfur dioxide. Each of the succeeding effects will operate at a pressure of about 20 p.s.i.a. less than the preceding effect and at corresponding decomposition temperatures. For instance, the second effect separator column in a two effect system will generally operate at a pressure of about 20 to 60 p.s.i.a., preferably about 20 to 40 p.s.i.a., and a temperature of about 250 to 300° F., preferably 260 to 280° F.

When it is desired to remove potassium sulfate, an undesirable by product of the process, from the potassium bisulfite, a portion of the solution in line 116 can be diverted through line 144 where a centrifuge 146, or if desired, a filter, separates the potassium sulfate crystals through discharge line 147. If a slurry of potassium bisulfite is used as feed to stripper column 122, the diversion and separation of potassium sulfate can be accomplished in line 134' or line 142.

The nature of the system and its operation is such that it is not adversely affected by the cyclic nature of plant operations, the temperature of gases to be processed (e.g. drop in temperature of power plant gases in the evening), or the sulfur or solids content of the gas, and thus provides great flexibility. Thus it can purify any gas containing $SO_2$, $SO_3$ or particulate solids or any other similar types of components in any type of gas which is compatible with the system and will not be deleteriously affected by, or deleteriously affect, the system.

TABLE I

| Run | Flue gas inlet temp., ° F. | Water flow to spray nozzle, g.p.m. | Mols of $H_2O$ per mol of dry gas | Flue gas outlet temp., ° F. | Flue gas outlet humidity, percent |
|---|---|---|---|---|---|
| 1 | 300 | 0.0 | 0.060 | 300 | 6 |
| 2 | 300 | 0.1 | 0.075 | 255 | 8 |
| 3 | 300 | 0.2 | 0.085 | 215 | 12 |
| 4 | 300 | 0.3 | 0.105 | 180 | 20 |
| 5 | 300 | | 0.135 | 128 | 100 |

EXAMPLE I

The following table, Table II, sets forth a specific example of this process within the conditions and parameters set forth in the discussions referring to FIGS. 1 and 2 of the drawing and using essentially the same specific examples noted in the drawings, the table giving specific compositions of the streams for the various flow lines and prevailing temperatures. The flue gas has the typical composition in mole percent; sulfur dioxide, 0.3; oxygen, 3.4%; water vapor, 6.0%; carbon dioxide, 14.2%; nitrogen, 76.1%; and sulfur trioxide, 0.0003%. Essentially no potassium sulfate is produced. The vacuum type flash cooler is operated at 1 p.s.i.a. and 104° F., water is removed from the flash cooler at a rate of about 140 pounds per hour and the pH of the solution in the crystallizer is about 7.0 to 7.2.

TABLE II

| Process Stream | Flue gas line 12 | Into absorber 30 | Flue gas line 14 | Absorber feed line 16 | Absorber discharge line 18 | Crystal discharge blade 108 | Filtrate line 102 |
|---|---|---|---|---|---|---|---|
| $SO_2$, lbs./min | 0.644 | 0.644 | 0.064 | 15.03 | 15.61 | 2.49 | 13.12 |
| $K_2S_2O_5$, lbs./min | | | | 13.25 | 15.27 | 4.25 | 11.0 |
| $K_2SO_3$, lbs./min | | | | 18.21 | 16.78 | 0.09 | 16.7 |
| $K_2SO_4$, lbs./min | | | | 1.77 | 1.77 | 0.27 | 1.5 |
| $SO_3$, mol percent | 0.0003 | 0 | | | | | |
| $H_2O$, lbs./min | X | | X+5.0 | 35.10 | 30.6 | 0.0 | 30.6 |
| Solids, lbs./min | | | | 33.23 | 33.8 | 4.61 | 29.2 |
| Total, lbs./min | 110 | | 114.4 | 67.33 | 6.44 | 4.61 | 59.8 |
| Glue gas, a.c.f.m | 2,010 | | 1,550 | | | | |
| Fly ash, grains/ft.$^3$ | [1] 0.3 | 0 | | | | | |
| G.p.m | | | | 5.6 | 5.2 | | 5.0 |
| Specific gravity | | | | 1.44 | 1.48 | | 1.43 |
| Temp., ° F | 300 | 255 | 125 | 150.0 | 135 | 104 | 104 |
| pH | | | | 7.2 | 7.1 | | |
| Relative humidity, precent | 6 | [2] 8 | | | | | |

| Process stream | Stripper column feed line 116 | Combined stripper column overhead lines 124 and 124' | Combined stripper column product lines 131 and 131' | Stripper column bottoms line 134' | Water feed to prescrubber line 24 |
|---|---|---|---|---|---|
| $SO_2$, lbs./min | 2.49 | 0.58 | 0.58 | 1.91 | |
| $K_5S_2O_5$, lbs./min | 4.25 | | | 2.25 | |
| $K_2SO_3$, lbs./min | 0.90 | | | 1.51 | |
| $K_2SO_4$, lbs./min | 0.27 | | | 0.27 | |
| $SO_3$, mol percent | | | | | |
| $H_2O$, lbs./min | 6.60 | 2.10 | 0.044 | 4.50 | 0.83 |
| Solids, lbs./min | 4.61 | | | 4.03 | |
| Total, lbs./min | 11.21 | 2.68 | 0.624 | 8.53 | 0.83 |
| Flue gas, a.c.f.m | | | | | |
| Fly ash, grains/ft.$^3$ | | | | | |
| G.p.m | 0.98 | | | 0.75 | 0.10 |
| Specific gravity | 1.37 | | | 1.42 | 1.0 |
| Temp., ° F | 120 | 225 | 197.5 | 258 | 86.0 |
| pH | | | | | |
| Relative humidity | | | | | |

[1] 1.5 grains per cubic foot into an electric precipitator and 0.3 grain out of the electric precipitator.
[2] Out of absorber zone 30, the relative humidity was 83%.

The $SO_2$ recovery system described above and in the attached drawings was employed in the treatment of flue gas from a coal-burning power plant. To evaluate the temperature drop of the incoming flue gas after being routed through the pre-scrubber, several runs were made at varying ratios of scrubbing water to waste gas. In each run the flue gas was introduced to the prescrubber at a flow rate of about 2000 cubic feet per minute and at a temperature of about 300° F. The temperature and humidity of the gas as it exited the top of the impingement target was recorded. Results are presented in Table I following:

EXAMPLE II

Essentially the same procedure used in Example I is followed except an aqueous solution of cesium sulfite is used instead of potassium sulfite to produce cesium bisulfite and recover $SO_2$.

EXAMPLE III

Essentially the same procedure used in Example I is followed except an aqueous solution of rubidium sulfite is used instead of potassium sulfite to produce rubidium bisulfite and recover $SO_2$.

Figure 3:
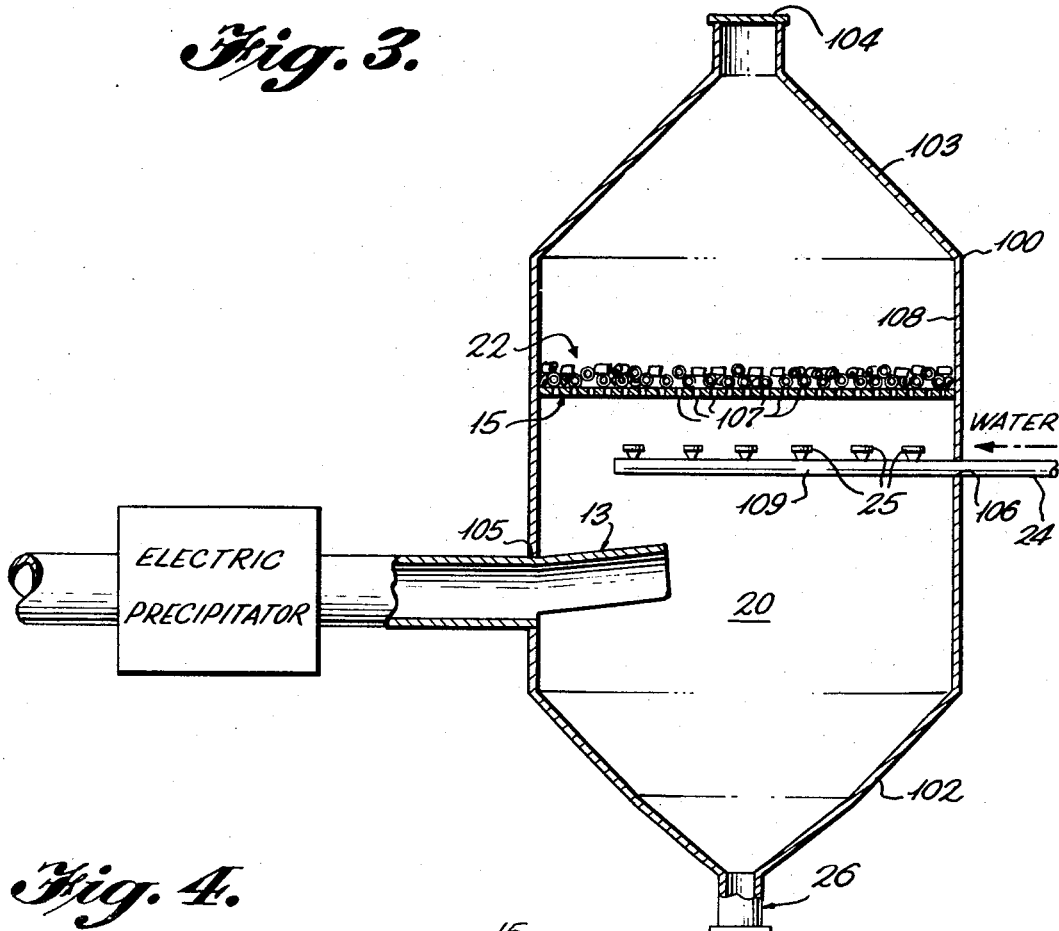
FIG. 3 is a sectional view of a unit for removing particulate solid or liquid soluble contaminants from a gas stream.
Figure 4:
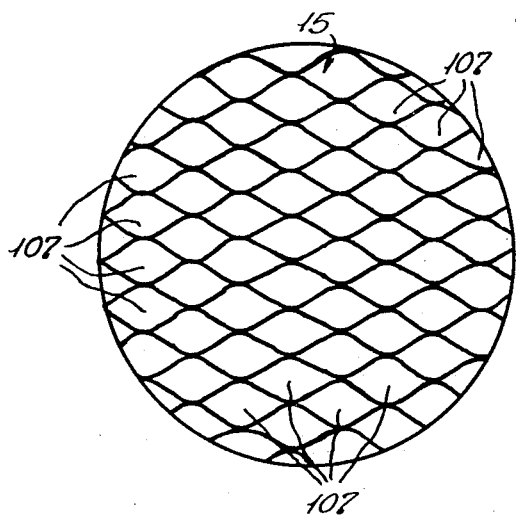
FIG. 4 is an elevational view of a packing column support tray.

FIG. 3 is a sectional view of a design of apparatus of the present invention as described in conjunction with FIGS. 1 and 2 but for independent use in removing particulate solids or liquid soluble components in a gas stream. It also shows passage of the gas through, for the removal of large particles in, electrical precipitator 200 and the effect of prescrubber 10 is utilized on the size and part of the particulate solids which is generally more difficult to remove. Referring to FIG. 3 there is shown reactor vessel 100, comprising a cylindrical mid-section 101 having circular gas inlet 105 located in the bottom quarter of the mid-section and pipeline liquid spray means positioned through opening 106 and extending laterally into the mid-section. It has a conical bottom portion 102 having an outlet 26 for removing liquid and particulate solid matter; and an inverted conical top portion 103 having gas outlet 104 for removing purified gas. Circular support plate 15 having a plurality of openings 107, see FIG. 4, is axially mounted in zone 20 above pipe 24 and fixedly engages internal wall 108 of mid-section 101, and supports a packed column 22 composed of three layers of ceramic Raschig rings. The packed column and support plate define a gas-permeable impingement target 110. Gas inlet 105 matchingly engages gas inlet pipe 12 having a bonnet shaped end 13, extending upwardly into zone 20 below pipe 24 and is in gas communication with target 110. Spray nozzles 25 are preferably evenly spaced along internal portion 109 of pipe 24 and are mounted to spray a continuous stream of liquid, e.g. water, toward, and in liquid communication with, target 110.

It is claimed:

1. A process for recovering $SO_2$ from an $SO_2$-containing gas comprising conducting the gas to an absorption zone, contacting the $SO_2$-containing gas in the absorption zone with an aqueous solution of sulfite selected from the group consisting of potassium sulfite, cesium sulfite, and rubidium sulfite at a temperature sufficient to absorb $SO_2$ from the gas and produce an aqueous solution of the corresponding bisulfite which is a precursor of $SO_2$, removing the precursor-containing solution from the absorption zone, precipitating the bisulfite as crystals of the corresponding metal pyrosulfite having a purity of greater than about 65%, separating said crystals, adding sufficient water to the crystals to form a pumpable mixture, decomposing the mixture in a decomposition zone having first and second stages, by heating the mixture in the decomposition zone in the first stage at a temperature and pressure sufficient to decompose bisulfite which may be in the form of pyrosulfite and produce a first gaseous product of water vapor containing $SO_2$ and an aqueous sulfite and bisulfite-containing solution, conducting the liquid product to the second stage, heating the second stage indirectly with the first stage gaseous product at a temperature and pressure sufficient to decompose bisulfite therein and produce a second gaseous product of water vapor containing $SO_2$ and an aqueous sulfite solution, separating the gaseous products and recovering $SO_2$.

2. Process of claim 1 wherein the first and second gaseous streams are each saturated with $SO_2$.

3. Process of claim 1 wherein the pumpable mixture contains about 20 to 75 weight percent water based upon the bisulfite and water.

4. Process of claim 2 wherein the pumpable mixture is a slurry containing about 60 to 70 weight percent solids.

5. Process of claim 2 wherein the pumpable mixture is a solution containing about 35 to 55 weight percent bisulfite.

6. Process of claim 3 wherein the temperature in the decomposition zone is between about 230° and 600° F. and the pressure is between about 0 and 300 p.s.i.a.

7. Process of claim 3 wherein the temperature in the decomposition zone is between about 230° and 400° F. and the pressure is between about 15 and 150 p.s.i.a.

8. Process of claim 1 wherein the sulfite is potassium sulfite, the bisulfite is potassium bisulfite, the crystals are potassium pyrosulfite and the first and second gaseous streams are saturated with $SO_2$.

9. Process of claim 8 wherein the pumpable mixture contains about 20 to 75 weight percent water based upon the bisulfite and water.

10. Process of claim 9 wherein the first stage temperature is about 275° to 400° F., the first stage pressure is about 40 to 80 p.s.i.a., the second stage temperature is about 250° to 300° F. and the second stage pressure is about 20 to 60 p.s.i.a.

11. Process of claim 10 wherein the pumpable mixture is a slurry containing about 60 to 70 weight percent solids.

12. Process of claim 10 wherein the pumpable mixture is a solution containing about 35 to 55 weight percent bisulfite.

13. Process of claim 9 wherein the purity is above 90 weight percent.

14. Process of claim 1 wherein the purity is above 90 weight percent.

References Cited

UNITED STATES PATENTS

| 1,589,133 | 6/1926 | Eustis | 23—178 |
| 2,368,600 | 1/1945 | Rosenstein | 23—3 |

OTHER REFERENCES

Bettelheim, Chem. Abs., vol. 55, p. 21733a (1961).
Bodor et al., Chem. Abs., vol. 57, p. 4505b (1962).
Epifanov et al., Chem. Abs., vol. 58, p. 11995f (1963).
Perry, Chem. Engrs. Handbook, 4th edit., sect. 14, p. 2; sect. 17, pp. 10, 11 (McGraw-Hill 1963).

OSCAR R. VERTIZ, Primary Examiner

C. B. RODMAN, Assistant Examiner

U.S. Cl. X.R.

423—539